Oct. 4, 1927.

T. J. BACHOFEN 1,644,461

PROCESS FOR PIECE DYEING

Filed March 9, 1926    8 Sheets-Sheet 1

Oct. 4, 1927.

T. J. BACHOFEN

1,644,461

PROCESS FOR PIECE DYEING

Filed March 9, 1926   8 Sheets-Sheet 2

Inventor,
T. J. Bachofen,
By
Atty.

Oct. 4, 1927.

T. J. BACHOFEN 1,644,461

PROCESS FOR PIECE DYEING

Filed March 9, 1926     8 Sheets-Sheet 3

Oct. 4, 1927.                                     1,644,461
T. J. BACHOFEN
PROCESS FOR PIECE DYEING
Filed March 9, 1926      8 Sheets-Sheet 5

Inventor,
T. J. Bachofen,
By                Atty.

Oct. 4, 1927.  
T. J. BACHOFEN  
1,644,461  
PROCESS FOR PIECE DYEING  
Filed March 9, 1926  8 Sheets-Sheet 6

Inventor,  
T. J. Bachofen,  
By  
Atty.

Oct. 4, 1927.

T. J. BACHOFEN

1,644,461

PROCESS FOR PIECE DYEING

Filed March 9, 1926    8 Sheets-Sheet 7

Inventor,
T. J. Bachofen,
By
Atty.

Patented Oct. 4, 1927.

1,644,461

UNITED STATES PATENT OFFICE.

THEODOR J. BACHOFEN, OF WESTBROOK, MAINE.

PROCESS FOR PIECE DYEING.

Original application filed November 4, 1925, Serial No. 66,818. Divided and this application filed March 9, 1926. Serial No. 93,480.

The invention relates to a process for piece dyeing of goods, such as broadcloth, silk goods, cotton goods, worsted goods, mixed piece goods, and the like, and is a division of an application filed by me November 4, 1925, Serial Number 66,818.

In the art of piece dyeing various processes are employed by which piece goods are exposed to all kinds of shrinkages from 5% to over 50%, according to the nature and mixture of the fabric and in the dyeing or finishing process will have to be tentered or stretched out again to the desired or necessary width to remove the excess shrinkage. It is well known in the treatment that through this process of shrinking and stretching of the texture and especially so in crepe twist fabrics that defects occur, known as breaks, crowfeet, chafe marks, torn edges, etc. The greatest harm is done in the so called pin or rope dyeing where up to ten or more pieces are arranged in rope or strand formation and separated by a pin rack thereby causing chafe marks and streaky dyeing of pieces.

One of the objects of the present invention is to provide a process whereby broad piece goods may retain the desired length and width during the various processes of boil-off, bleaching, washing, dyeing and drying, and thereby control the shrinkage of the goods and prevent excess shrinkage and obviate the necessity of tentering the goods after such operations of boil-off, bleaching, washing, dyeing and drying.

A further object of the invention is to provide a simple, practical and comparatively inexpensive construction for enabling the goods to be maintained at the desired width and length and conveniently handled during such operations as boil-off, bleaching, washing, dyeing and drying, where the goods are exposed to excess shrinkage and to enable the goods, while held and prevented from such excess shrinkage to be handled more expeditiously and with a saving of time, labor and expense and at the same time expose the goods more completely to the aforesaid operations to enable the same to be performed more quickly and the goods more uniformly and effectively treated whether or not the goods be dyed.

Furthermore, it is an object of the invention to enable the name of the goods, the manufacturer, or any other desired matter to be placed on the goods at the edge thereof during the dyeing operation by forming the letters or other characters of undyed portions of the fabric for positively indicating the origin and genuineness of the goods.

Figure 6:
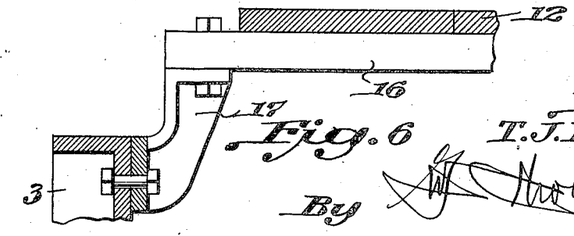
Fig. 6 is a detail view illustrating the manner of mounting the feed table.

In the accompanying drawings in which is illustrated the preferred embodiment of the invention; the machine comprises in its construction spaced sides 1 and suitable connecting transverse frame members and it is equipped at its front end at opposite sides with upper, lower and intermediate brackets 2, 3 and 4, the upper brackets being preferably formed integral with the sides of the frame and the intermediate and lower brackets being preferably constructed separate from and suitably secured to the sides of the frame, but the brackets may be constructed in any other desired manner, as will be readily understood. The lower brackets 4 are provided with bearings 5 for the reception of a shaft 6 of a roll 7 upon which is wound the fabric or woven goods 8 to be dyed or otherwise subjected to operations which cause a shrinking of the fabric. While the lower brackets 4 are shown equipped with a single set of bearings, any number of sets of bearings may be employed within the capacity of the machine for enabling a plurality of rolls of woven goods to be simultaneously operated on by the machine. For convenience of illustration only a single piece of woven fabric is illustrated and the woven fabric may be of any character, either silk, wool, or cotton, or a mixture thereof which it is desired to treat and subject to such operations as boil-off, bleaching, dyeing, washing, finishing and the like. The body portion of the roll 7 is preferably constructed of wood and the cloth extends upwardly from the cloth roll to a front guide roll 9 provided with a shaft 10 journaled in outer bearings 11 of the intermediate brackets 3. The front guide roll is located at the front or outer ends of the intermediate brackets 3 which support a feed table 12 and which are also provided at their inner ends with bearings 13 in which are journaled a shaft 14 of an inner lower guide roll 15 located in rear of and at the same elevation as the front guide roll 9. The feed table 12 which is constructed of wood or any other suitable material is secured to transverse bars 16 preferably constructed of wood and mounted upon arms or brackets 17 bolted or otherwise secured to the intermediate brackets of the frame of the machine and extending upwardly from the inner sides of the said intermediate brackets, as clearly illustrated in Fig. 6 of the drawings. The front and rear transverse edges of the feed are preferably beveled as shown, to conform to the contours of the guide rolls 9 and 15 and its upper face is substantially flush with the upper peripheries of the said rolls 9 and 15. The cloth from the cloth roll passes upwardly to the front guide roll 9 and it travels rearwardly over the feed table 12 which enables the operator to smooth out the cloth over the table and properly engage its side edges with links 18 of side chains 19 located at opposite sides of the machine and provided with means for engaging the side edges of the cloth for maintaining the proper width and length of the same so that when the cloth is subjected to operations producing shrinkage, the shrinkage of the cloth will be controlled and excess shrinkage prevented by maintaining the cloth the desired predetermined width and length during such operations as boil-off, bleaching, dyeing, washing and finishing. Excess shrinkage during such operations is prevented and it is unnecessary to tenter or stretch the goods after such operations to remove excess shrikage and restore the goods to their proper width and length and the injuries and damage to the goods and loss incident to such tentering or stretching operations are eliminated.

Figure 1:
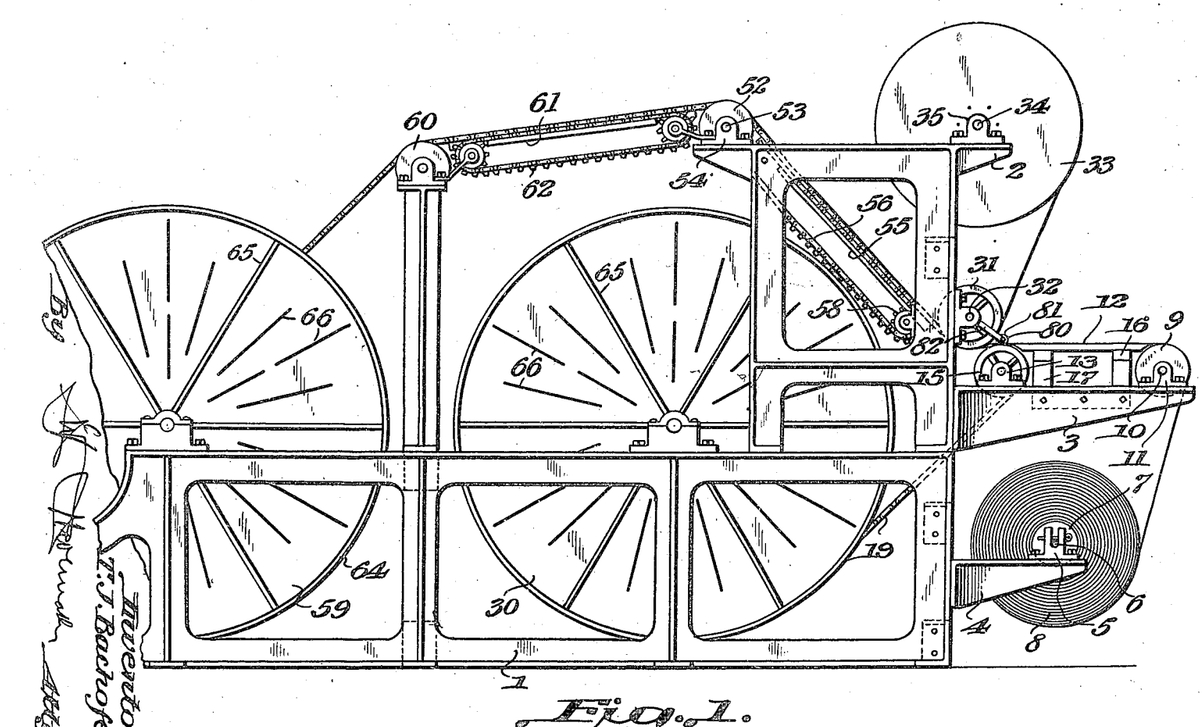
Figure 1 is a side elevation of a machine constructed in accordance with this invention for maintaining the goods at the desired width and length, during various operations which subject the goods to shrinkage.
Figure 2:
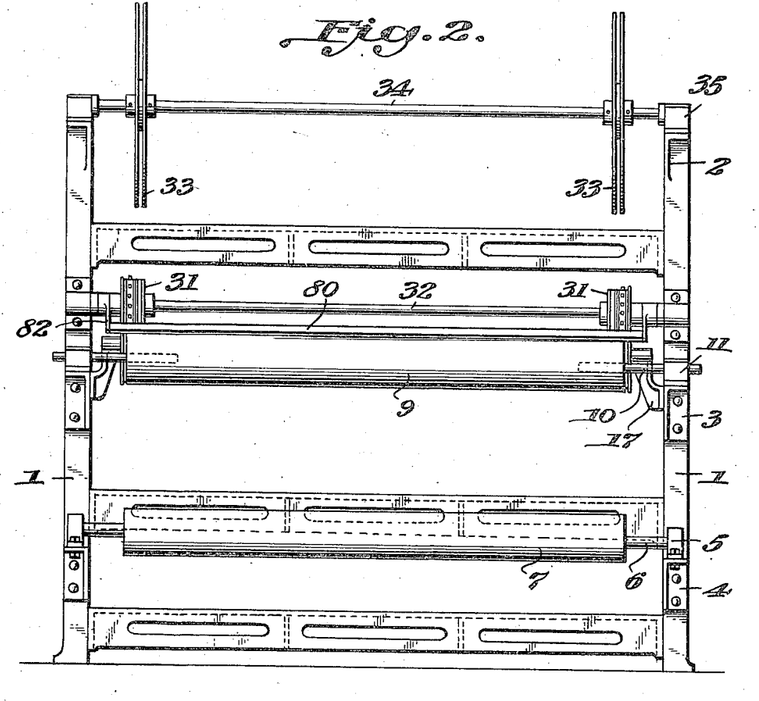
Fig. 2 is a front elevation of the same.
Figure 3:
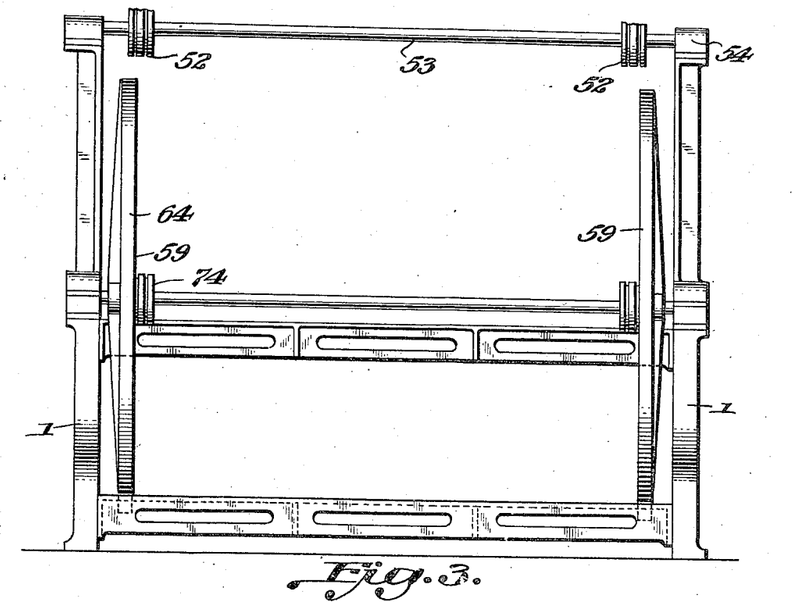
Fig. 3 is a rear elevation of the machine.
Figure 4:
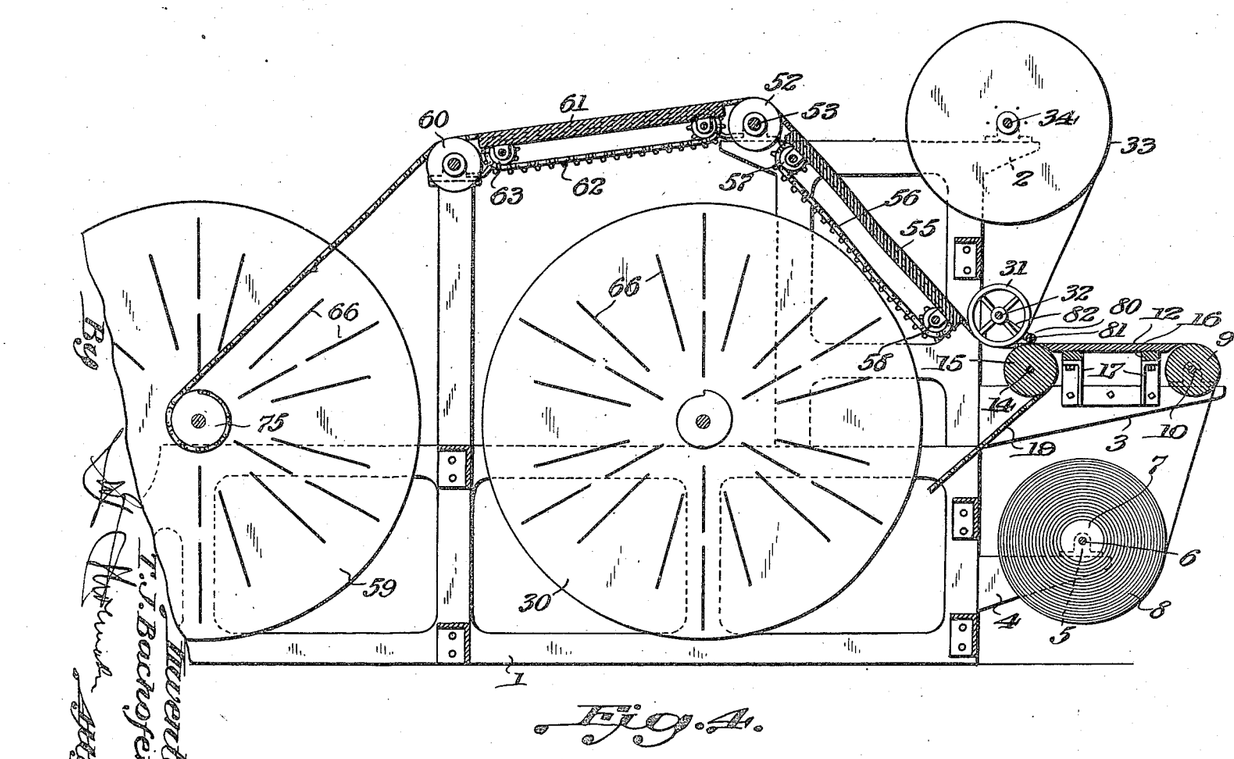
Fig. 4 is a central longitudinal sectional view thereof.
Figures 5, 7:
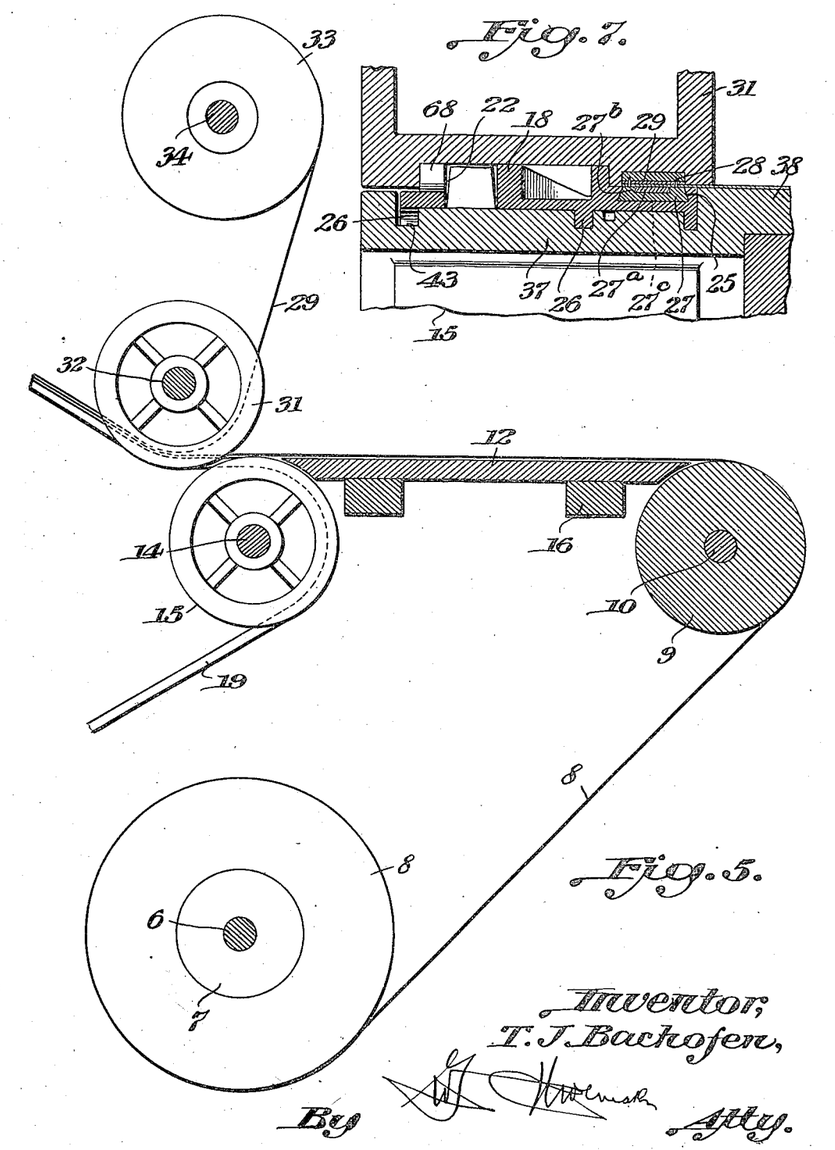
Fig. 5 is an enlarged detail longitudinal sectional view of a portion of the front of the machine illustrating the arrangement of the chains, the tape and the means for feeding the goods.
Fig. 7 is an enlarged transverse sectional view illustrating the manner of applying the goods and the tape to the chain.
Figure 11:
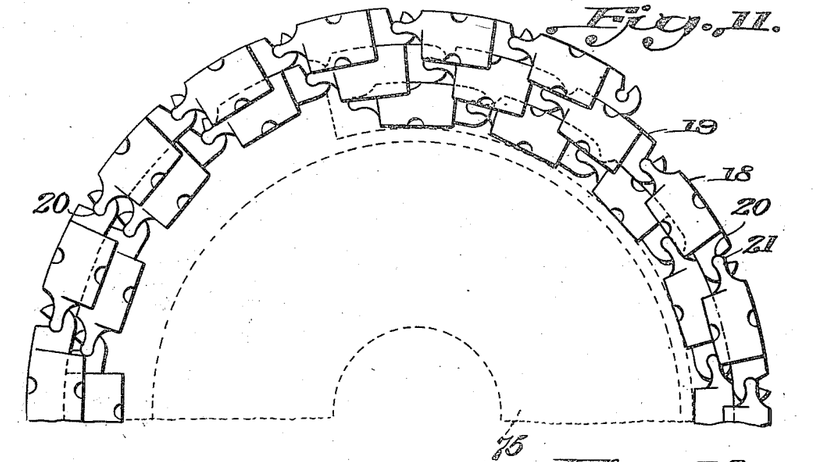
Fig. 11 is a detail view illustrating the manner in which the links of the chain build up on the drum.
Figures 12, 14:
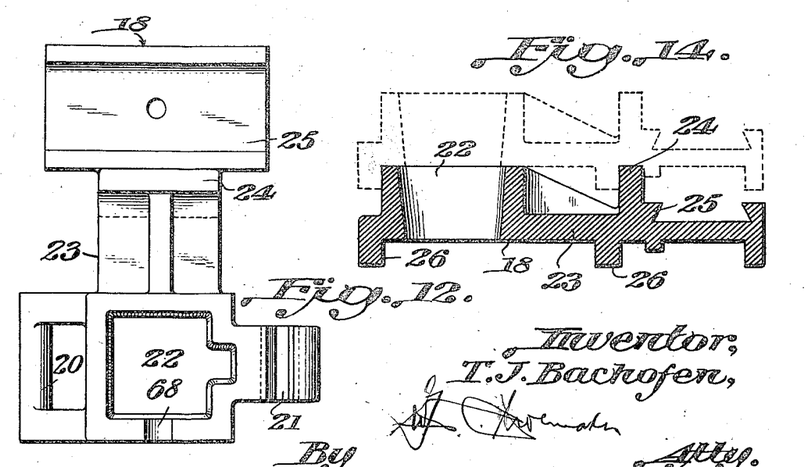
Fig. 12 is a plan view of one of the links.
Fig. 14 is a transverse sectional view of one of the links.
Figure 13:
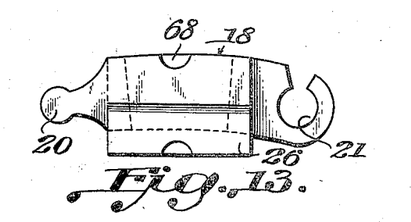
Fig. 13 is a side elevation of the same.
Figure 15:
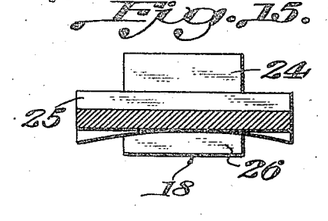
Fig. 15 is a longitudinal sectional view of the same.

In practice, the chains which are reeled from one drum to another are composed of the said links 18 detachably and flexibly connected with one another by means of transverse pivot portions 20 and bearings 21 similar to the links of an ordinary sprocket chain. The bearings 21 are open at the top and the links adjacent to the pivot portions are constructed to conform to the configuration of and pass through the recesses or openings at the top of the bearings 21 by relative lateral movement of the links in the usual manner. Each link which is composed of an outer, inner and intermediate portion is provided at the outer portion with a substantially rectangular opening 22 to receive sprockets or projections of rotary elements over which the chains pass. The intermediate portion 23 of the link consists of a horizontal web and a vertical reinforcing web or flange, as shown, but it may be of any other desired construction, and it is provided with a vertically disposed supporting flange 24 extending longitudinally of the chain and having its upper face arranged in substantially the same place as the upper edges of the outer portion of the link to cooperate with the upper edges of the said outer portion of the link for supporting the links when the chain is coiled on a drum and the links build up on the said drum, as indicated in Fig. 11 of the drawings. The inner portion of the link is provided with a shallow channel 25 extending longitudinally of the chain and preferably formed by inner and outer flanges projecting from the upper face of the inner portion of the chain. The link is provided at its lower face with inner, outer and intermediate parallel flanges 26 extending longitudinally of the chain and adapted to fit in annular grooves of the chain drums, or other rotary elements over which the chains pass or on which the same are wound or coiled. These flanges 26 prevent any movement of the links laterally of the chains and in addition to engaging the annular grooves of the drum and guide rolls, the intermediate and outer flanges 26 are adapted to engage the outer side and supporting flange of the supporting link when one link is placed upon another, as clearly illustrated in Fig. 10 of the drawings. This will interlock the links when the chains are coiled around the chain drums and enable the chains to withstand the lateral strain incident to the tendency of the cloth to shrink. The channel at the inner portion of the link is adapted to receive a plate 27 suitably secured in the channel and provided with spaced projecting pins 28 which are adapted to pierce the cloth and hold the same on the links. The pins or projections are preferably arranged in two rows in staggered relation, as clearly shown in Fig. 7 of the drawings, to permit either a flat tape 29, or a cord to be employed for holding the cloth in engagement with the pins when the pins are used without the name plates hereinafter described. As illustrated in Fig. 5 of the drawings, the chains are fed upwardly and forwardly from a chain drum 30 to the guide roll 15 and they pass upwardly around the front and top portions of the said guide roll 15 and receive the cloth at the top of the said roll 15. The chains extend rearwardly from the guide roll 15 and pass beneath a guide roll 31 located above the guide roll 15 and having its shaft 32 located slightly in rear of the shaft 14 of the guide roll 15. The links 18 have a slight curvature longitudinally of the chain, as clearly illustrated in Fig. 13 of the drawings to enable the chain to be coiled on the chain drums and to build up upon one another, as shown in Fig. 11.

Figures 8, 9, 10:
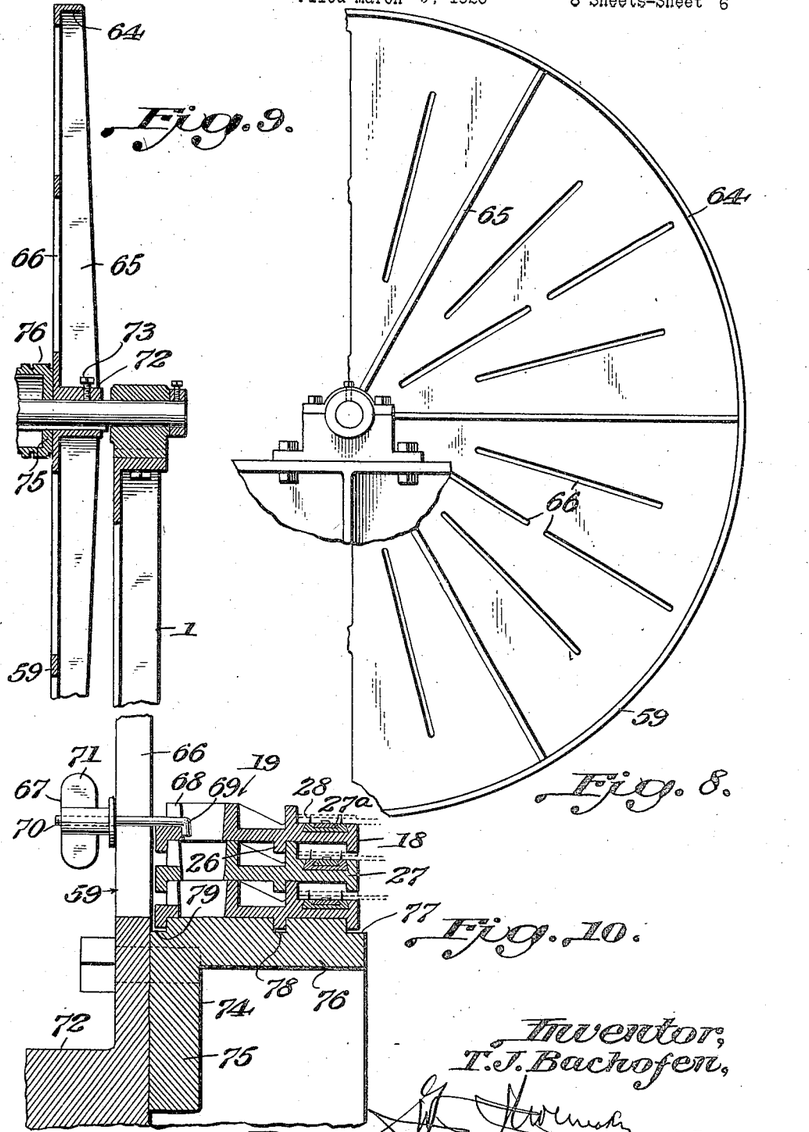
Fig. 8 is a detail elevation of a portion of one side of the fabric holding drum.
Fig. 9 is a vertical sectional view of the same.
Fig. 10 is an enlarged detail sectional view of one side of the central portion of the drum illustrating the arrangement of the links.

The side edges of the cloth are properly engaged with the pins of the links and as the chains and the cloth travel rearwardly beneath the guide roll 31, the pins will be caused to perforate the cloth and also perforate the flat tape 29 which passes downward from an overhead tape supply reel 33 having a shaft 34 which is journaled in suitable bearings 35 of the top bracket 2. A pair of tape supply reels is provided and they are located at opposite sides of the front portion of the frame of the machine at the top thereof. The chains, the cloth and the tapes travel upwardly and rearwardly from the lower periphery of the guide roll 31 and are subjected to sufficient pressure and tension to positively engage the tapes and the cloth with the projecting pins of the chains and the tapes will operate to maintain the side edges of the cloth securely on the pins of the links during the various operations to which the cloth may be subjected. When it is desired to employ a cord instead of a flat tape, the cord will pass between the rows of projecting pins, the pins of one row being preferably located opposite the pins of the other row, as shown in Fig. 10. The cord will lie between the rows of pins and each succeeding layer or convolution will bind the previous layer, or convolution on the drum.

Figure 16:
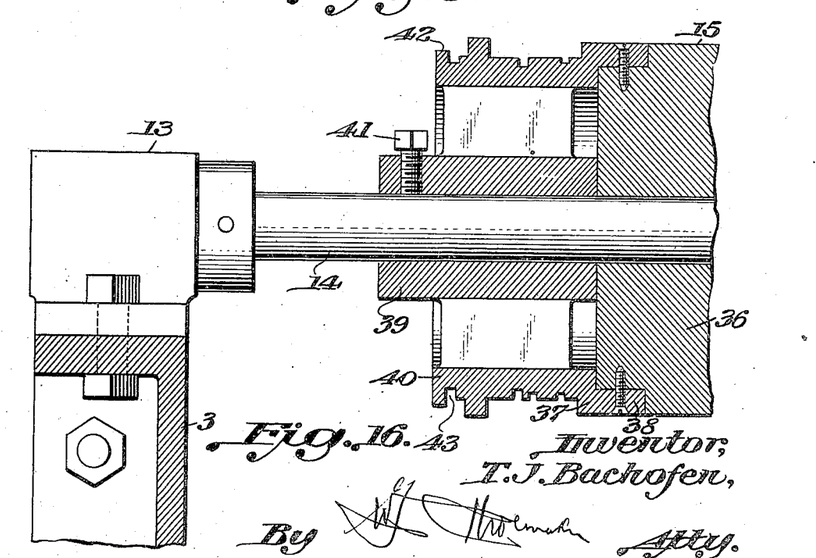
Fig. 16 is a detail transverse sectional view illustrating the construction of one of the guide rolls.
Figure 17:
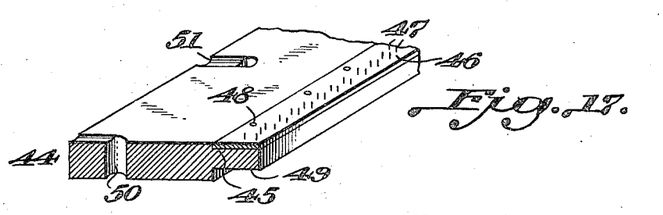
Fig. 17 is a detail sectional view illustrating a portion of a belt for maintaining the goods the proper width and length.
Figures 18, 19, 20:
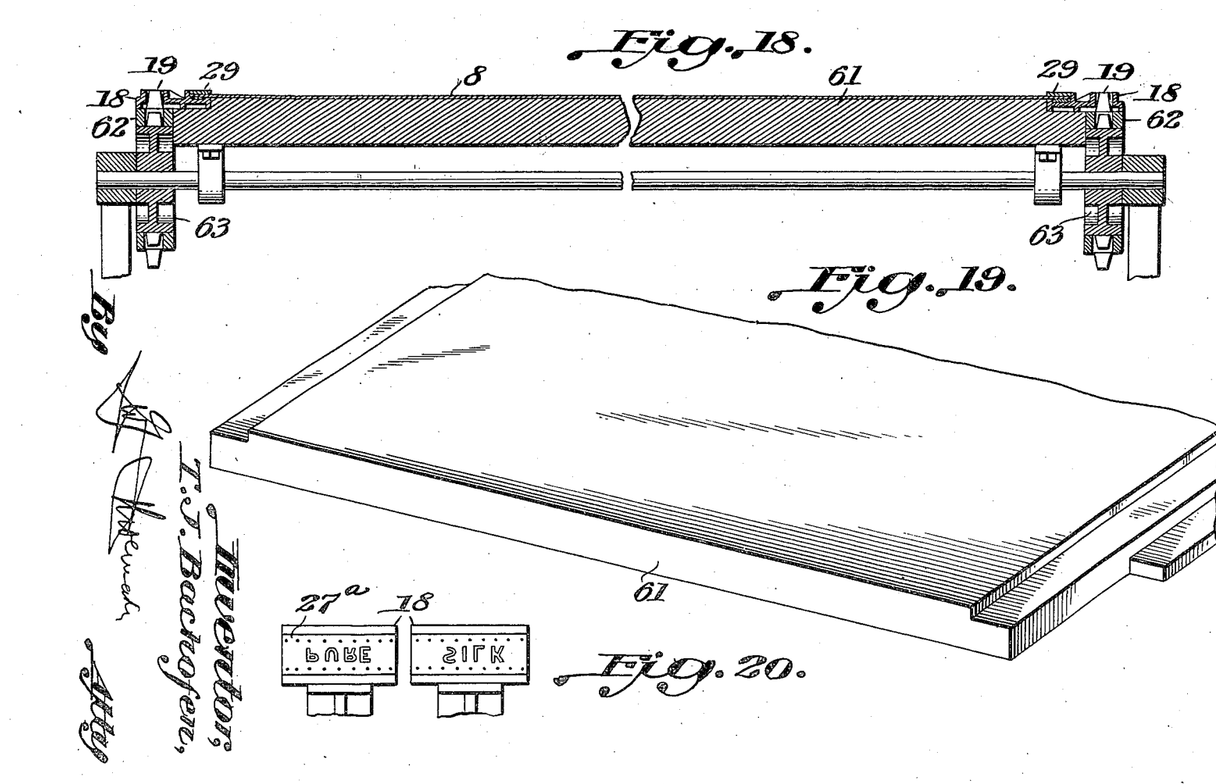
Fig. 18 is an enlarged transverse sectional view illustrating the construction for supporting the rear flights of the cloth carrying chains.
Fig. 19 is a detail perspective view of the supporting board shown in Fig. 18.
Fig. 20 is a detail sectional view illustrating the construction of the name plates.

The guide roll 15 may consist of a body portion 36 of wood, or other suitable material, and be provided with metallic end sections 37 provided with annular attaching flanges 38 which cap the ends of the body portion 36 and fit in annular recesses thereof, as clearly illustrated in Fig. 16 of the drawings. The metallic end sections 37 are provided with hub portions 39 and peripheral portions 40, the hub portions being keyed or otherwise fixed to the shaft 14 and provided with a clamping screw 41 for engaging the shaft to maintain the same rigid and hold the roll against relative longitudinal movement. Any other suitable means may of course be employed for mounting the guide roll 15 on the shaft 14. The peripheral portion 40 of the metallic end sections of the guide roll 15 is provided with a projecting annular flange 42 and it has inner, outer and intermediate annular grooves 43 to receive the lower flanges of the links of the chain whereby the links of the chain are interlocked with the metallic end sections of the guide roll 15 and are held against relative lateral movement. By this construction, the chains are maintained in proper spaced relation and if desired, the wooden body portion 36 may be omitted as the cloth will be supported at its side edges by the chains which will maintain the cloth the proper width and length. Projections of other forms may be provided and such projections may be in the form of a name or device for indicating the origin and genuineness of the fabric. When projections of this character are employed, the portion of the cloth pressed against the characters by the tape will be practically unaffected by the dye and will leave undyed portions of the cloth at the side edges. In this manner, the name of the manufacturer, the name of the cloth, or any other device or trademark may be applied to the side edges of the goods. These name plates 27$^a$ are preferably mounted upon the plates 27 and arranged between the pins thereof. The plates 27 are provided with dove-tailed grooves 27$^b$ to receive the name plates and the side edges of the latter are oppositely beveled to conform to the configuration of the side walls of the dove-tailed groove. Also, the groove or channel in the inner portion of the links is also preferably dove-tailed to interlock the plates carrying the pins with the inner portions of the links. Both the pin carrying plates and the name plates may be securely fastened in their respective dove-tailed grooves by means of a screw 27$^c$ mounted in a threaded perforation of the inner portion of the link and extending upwardly from the lower face of the same into registering apertures in the pin carrying plate and the name plate. Any other suitable means may of course be employed for securing the plates to the links and this construction will enable the name or stencil plates to be changed as required to suit the character of the goods operated on. Also, instead of employing the chains, flexible members for engaging and holding the cloth and maintaining the same the proper width and length may be in the form of belts 44 as illustrated in Fig. 17 of the drawings. The belt 44 which may be constructed of any suitable material, is provided at its upper face adjacent to its inner edge with a longitudinal channel 45 in which is secured a thin strip 46 of suitable metal provided at its upper face with projecting pins 47 preferably arranged in two rows with the pins in staggered relation in the said strip 46 which is secured by rivets 48, or other suitable fastening devices to the belt. The belt is provided at its lower face with a longitudinal recess 49 forming a shoulder for interlocking the belt with the drums or other rotary members over which the belt may pass or on which the belt is coiled and suitable openings 50 and laterally extending grooves 51 are provided in the belt for the reception of hooks similar to the hook 67 shown in Fig. 10, or other suitable fastening devices for securing the convolutions of the belt to the sides of the drum to prevent lateral movement of the belt on the drum when the belt is subjected to the tension of the cloth incident to the tendency of the cloth to shrink when subjected to the aforesaid operations.

The chains are fed from the chain drum 30 and pass upwardly and rearwardly from the guide roll 31 to an upper intermediate guide roll 52 having a shaft 53 journaled in suitable bearings 54 mounted upon brackets projecting rearwardly from the top portion of the frame. The upper intermediate guide roll 52 may consist of a body portion of wood or other suitable material and metallic end sections similar to the guide roll 15 heretofore described, but the body portion may be omitted if desired. The flight or portion of the chains and the cloth traveling upwardly and rearwardly between the guide rolls 31 and 52 may be supported by an inclined board or member 55 and by endless chains 56 located at opposite sides of the inclined supporting board or member and arranged on upper and lower sprocket wheels 57 and 58 and having their upper flights traveling over the side portions of the inclined supporting board, preferably in recesses thereof. This construction will provide a support for the cloth holding chains and the cloth and will reduce the friction to a minimum. The inclined supporting board and the endless sprocket chains at opposite sides of the same may be omitted if desired. The cloth carrying chains and the cloth travel rearwardly from the guide roll 52 to a rear chain drum 59 and the chains and the cloth are preferably supported by an upper rear transverse guide roll 60 located slightly in advance of the top of the rear chain drum 59. The guide roll 60 is preferably constructed of the same as the guide roll and a supporting board or member 61 is arranged in the space between the guide rolls 52 and 60 and is equipped with endless chains 62 arranged on sprocket wheels 63 and adapted to receive and support the traveling cloth carrying chains and prevent the same from sagging between the guide roll 52 and the rear drum 59.

Each of the chain drums is composed of a pair of sides consisting of discs constructed of relatively thin metal as clearly illustrated in Fig. 9 of the drawings and provided with outwardly extending peripheral flanges 64 and radial ribs 65 which reinforce and stiffen the sides of the drum. The sides of the drum present smooth inner faces and are provided at intervals with radial slots 66 which are adapted to receive suitable fastening devices 67 for securing the chains 19 to the sides of the drum when the chains are coiled around the same as illustrated in Figs. 10 and 11. The chains are provided at intervals with recesses 68 formed in the upper portions of the outer sides of the links at intervals and adapted to receive the fastening devices 67 which are preferably in the form of hooks provided at their inner ends with bills 69 and having threaded outer portions 70 for the reception of thumb nuts 71. The fastening devices extending through the recesses and the bills 69 engage the recessed links interiorly of the openings 22 thereof and the thumb nuts engage the outer faces of the sides of the drum and hold the links securely against inward movement away from their proper position adjacent the inner faces of the sides of the chain drum. Any number of the fastening devices 67 may be employed and the arrangement of the radial slots or openings 66 will enable the fastening devices to be readily engaged with the recessed links occurring opposite the said radial slots or openings. Any other suitable fastening device may of course be employed for connecting the chains with the sides of the drum for holding the chains against inward movement. The sides of the drum are provided with integral hub portions 72 extending outwardly from the discs and keyed or otherwise secured to the shaft on which the drum is mounted and provided also with a clamping screw 73 for engaging the shaft to rigidly fasten the side of the drum to the shaft and hold the said side of the drum against movement longitudinally of the shaft. The sides of the drum are provided at their inner faces with annular chain supporting members 74, each consisting of a flat ring 75 and an annular inwardly projecting flange or cylindrical portion 76 extending from the outer edge of the flat ring 75. The flat ring 75 is bolted or otherwise secured to the inner face of the side of the chain drum and the cylindrical chain supporting portion is provided in its outer face with inner intermediate and outer circumferential recesses or grooves 77, 78 and 79 which receive the lower flanges of the contiguous links of the chains. The cylindrical chain supporting portion of the member 74 is preferably recessed at its edges to receive the flanges of the links and is grooved at 78, as shown in Fig. 10, and the links resting upon or fitting against the cylindrical portion 76 will be interlocked with the same and firmly held against lateral movement thereon.

If desired, a suitable pressure roll 80 may be arranged above the guide roll for pressing the cloth firmly in engagement with the projecting pins of the traveling chains before the cloth reaches the guide roll 31 and is engaged by the tapes. The pressure roll 80 is preferably mounted on suitable shaft 81 which is journaled in suitable bearings or arms or links 82 extending downwardly and forwardly from the shaft 32 and pivotally connected with the frame by the said shaft. This construction will permit the pressure roll to rest upon the chains and the guide roll 15 and will facilitate the feeding of the cloth to the cloth engaging means of the chains and will hold the cloth in engagement with the pins until the cloth is positively confined on the pins or other cloth engaging means by the tapes.

Any suitable means may be employed for driving the machine and in the operation thereof the cloth carrying chains are run off of the drum 30 and onto the drum 59 and when the cloth carrying chains with the cloth are arranged on the drum 59, the cloth will be spirally coiled or rounded with the convolutions of the coil or round in spaced relation and in a stretched condition and the space between the side chains will determine the width of the cloth and the amount of shrinkage permitted the cloth when the same is subjected to such operations as boil-off, bleaching, dyeing, washing, and finishing and will maintain the cloth at a predetermined length and width and prevent excess shrinking of the cloth. At the same time the cloth will be rolled on a drum or reel in convenient form to enable it to be readily handled for carrying out the aforesaid operations which may be performed more rapidly, thoroughly, uniformly and without injury to the cloth. Also, the operation of tentering or stretching which has heretofore been necessary to remove the excess shrinkage is eliminated.

Shrinkage varies greatly with the different kinds of piece goods and the sides of the chain drums with their chain supporting means are adjustable toward and from each other on the chain drum shaft by means of the clamping screws so that the desired width and length of a piece of goods may be retained and a limited amount of shrinkage permitted during such operations as boil-off, bleaching, dyeing, drying. While the cloth carrying chains are shown wound upon a reel or drum in the form of apparatus illustrated in the accompanying drawings, the openings in the cloth carrying chains are adapted to permit the chains to be engaged by sprockets of ordinary sprocket wheels so that the chains and the cloth carried thereby may be run into a boiler, dyeing vat, or other receptacle, and may extend back and forth in the same in spaced layer formation to arrange a piece of goods in relatively compact form to conveniently treat the goods in the aforesaid operations. The form of the apparatus may vary but by retaining the cloth at a predetermined width and length, a limited amount of shrinkage may be permitted and the shrinkage may be controlled and excess shrinkage prevented. Also, the arranging of a piece of cloth in spaced layer formation whether the cloth carrying chains or members be wound upon a reel or extend back and forth vertically or horizontally in a vat or other receptacle, the goods may be handled more expeditiously than heretofore and may be treated more uniformly with less labor and expense, and without the damage to the goods caused by tentering or stretching after dyeing and without the streaks and imperfect dyeing resulting from the dyeing of goods when there are a plurality of thicknesses of the fabric in close contact.

What is claimed is:

1. The method of controlling shrinkage and retaining the desired width and length of piece goods while the same are exposed to shrinkage consisting in winding the goods in spaced layers and positively maintaining the goods in a stretched and wound condition while the wound goods as a unit are subjected to such operations as boil-off, bleaching, dyeing, drying.

2. The method of controlling shrinkage and retaining the desired width and length of piece goods while the same are exposed to shrinkage, consisting in winding the goods in spaced layers and confining the goods while the same is in a dry condition to a predetermined width and length and exposing the wound goods as a unit to shrinkage in the operation of boil-off, bleaching, dyeing and drying and permitting a limited shrinkage of the goods.

3. The method of controlling shrinkage and retaining the desired width and length of piece goods while the same are exposed to shrinkage, consisting in spreading the goods while in a dry condition, winding the goods in spaced layers and confining the goods to a predetermined width and length and in a wound condition and exposing the confined and wound goods as a unit to the operations of boil-off, bleaching, dyeing, drying and the like and permitting a limited shrinkage of the goods.

4. The method of controlling shrinkage and retaining the desired width and length of piece goods while the same are exposed to shrinkage, consisting in confining a piece of goods in a dry condition to a predetermined width and length, arranging the piece of goods in successive layers in relatively spaced form, maintaining the goods in spaced form against relative movement of the layers and exposing the goods as a unit to shrinkage in the operations of boil-off, bleaching, dyeing, drying and the like, permitting a limited shrinkage of the goods and maintaining the goods at the said predetermined width and length until the goods are again in a dry condition.

5. The method of controlling shrinkage and retaining the desired width and length of piece goods while the same are exposed to shrinkage, consisting in confining a piece of goods in a raw condition to a predetermined width and length, arranging the piece of goods in spaced layer formation, holding the layers in such spaced formation against relative movement, exposing the goods as a unit to shrinkage in the operations of boil-off, bleaching, dyeing, drying and the like, permitting a limited shrinkage of the goods and maintaining the goods at the said predetermined width and length until the goods are again in a dry condition.

6. The method of controlling shrinkage and retaining the desired width and length of piece goods while the same are exposed to shrinkage, consisting in confining a piece of goods in a raw condition to a predetermined width and length, reeling the goods in spaced layer formation, exposing the goods to shrinkage in the operations of boil-off, bleaching, dyeing, drying and the like, permitting a limited shrinkage of the goods and maintaining the goods at the said predetermined width and length until the goods are in the desired condition.

7. The method of controlling shrinkage and retaining the desired width and length of a piece of goods consisting in spreading the goods while the same are in a dry condition, winding the goods in spaced layers and confining the goods while in a dry condition to a predetermined width and length, then subjecting the goods to a plurality of operations where the goods are exposed to shrinkage permitting a limited amount of shrinkage and maintaining the goods in a stretched condition of the said predetermined width and length during the entire operations and until the goods are in a dry condition and to eliminate tentering or stretching the goods after such operations.

In testimony whereof I have hereunto set my hand.

THEODOR J. BACHOFEN.